United States Patent
Pärn

[19]

[11] Patent Number: 5,816,611
[45] Date of Patent: Oct. 6, 1998

[54] ARRANGEMENT FOR DISCONNECTING A VEHICLE AIRBAG

[75] Inventor: Jüri Pärn, Mölndal, Sweden

[73] Assignee: AB Volvo, Sweden

[21] Appl. No.: 750,389

[22] PCT Filed: Jun. 7, 1995

[86] PCT No.: PCT/SE95/00675

§ 371 Date: Mar. 10, 1997

§ 102(e) Date: Mar. 10, 1997

[87] PCT Pub. No.: WO95/33636

PCT Pub. Date: Dec. 14, 1995

[30] Foreign Application Priority Data

Jun. 7, 1994 [SE] Sweden .................................. 9401976

[51] Int. Cl.⁶ .................................................. B60R 21/16
[52] U.S. Cl. .................. 280/734; 280/736; 200/61.58 B
[58] Field of Search ................... 280/728.1, 732, 280/735, 736, 741; 180/270, 272; 340/457.1; 200/61.58 B

[56] References Cited

U.S. PATENT DOCUMENTS 5,174,600  12/1992  Jahn et al. ............................... 280/733
5,413,378  5/1995  Steffens, Jr. et al. .................... 280/735
5,428,340  6/1995  Kawabata et al. ....................... 340/438
5,468,014  11/1995  Gimbel et al. .......................... 280/735

FOREIGN PATENT DOCUMENTS 4237142  4/1993  Germany .
4228624  3/1994  Germany .
4410402  9/1994  Germany .
4426677  2/1995  Germany .

Primary Examiner—Charles Jordan
Assistant Examiner—Christopher K. Montgomery
Attorney, Agent, or Firm—Samuels, Gauthier, Stevens & Reppert

[57] ABSTRACT

An arrangement for selectively disconnecting an airbag fitted within a passenger compartment of a motor vehicle. The arrangement includes a visible warning means retractable within a component and adapted to be withdrawn to extend over at least a predetermined region of the component. The warning means cooperates with airbag deployment means such that when the warning means is in its retracted position, the airbag deployment means is armed and when the warning means is in its withdrawn position, the airbag deployment means is disarmed.

8 Claims, 2 Drawing Sheets

ARRANGEMENT FOR DISCONNECTING A VEHICLE AIRBAG

TECHNICAL FIELD:

The present invention relates to an arrangement for selectively disconnecting an airbag fitted to a motor vehicle.

BACKGROUND OF THE INVENTION:

It is desirable to be able to deactivate a passenger airbag in a car when, for example, a rear-facing child seat is installed on the passenger seat. One means for deactivating an airbag is disclosed in U.S. Pat. No. 3 863 209 in which a load-dependent switch is arranged in the seat cushion. Thus, only when the seat is occupied by a person of sufficient weight will the airbag sensor be armed. A disadvantage with such a system is that the load-dependent switch cannot distinguish between a human being and a heavy item which may be placed on the seat.

It is also known from, for example, DE-A-4 023 109 to use optical or ultrasonic transmitters and sensors to detect the presence of a seat occupant, though such systems are relatively difficult to install.

Despite the availability of various systems which purport to be able to distinguish between a rear-facing child seat and a normally seated passenger, there is still a need for a system which is manually activated by e.g. the driver of the vehicle so that the driver is certain that the airbag is indeed disconnected.

Probably the simplest manually activated system is an on-off switch which may, for example, be located on the dashboard of the vehicle. A disadvantage with such a system is, however, that it is too easy to overlook the fact that the airbag deployment arrangement is still deactivated once the child seat has been removed and an adult occupies the seat. Such an oversight can of course have serious consequences should the vehicle be involved in an accident.

Whilst an on-off switch can be provided with e.g. a telltale warning light, a need exists for a more evident indication that the airbag is disconnected.

SUMMARY OF THE INVENTION:

It is therefore an object of the present invention to provide a manually actuated airbag disconnection arrangement in which a vehicle occupant can easily ascertain whether the airbag is connected or disconnected.

This object is achieved by an arrangement for selectively disconnecting an airbag fitted within a passenger compartment of a motor vehicle, the airbag being provided with airbag deployment means, the arrangement comprising visible warning means retractable within a component inside the passenger compartment and adapted to be withdrawn to extend over at least a predetermined region of the component, the warning means cooperating with the airbag deployment means such that when the warning means is in a retracted position within the compartment, the airbag deployment means is armed and when the warning means is in a withdrawn position, the airbag deployment means is disarmed.

BRIEF DESCRIPTION OF THE DRAWINGS:

The invention will be described in greater detail in the following by way of example only and with reference to the attached drawings, in which.

Figure 1:
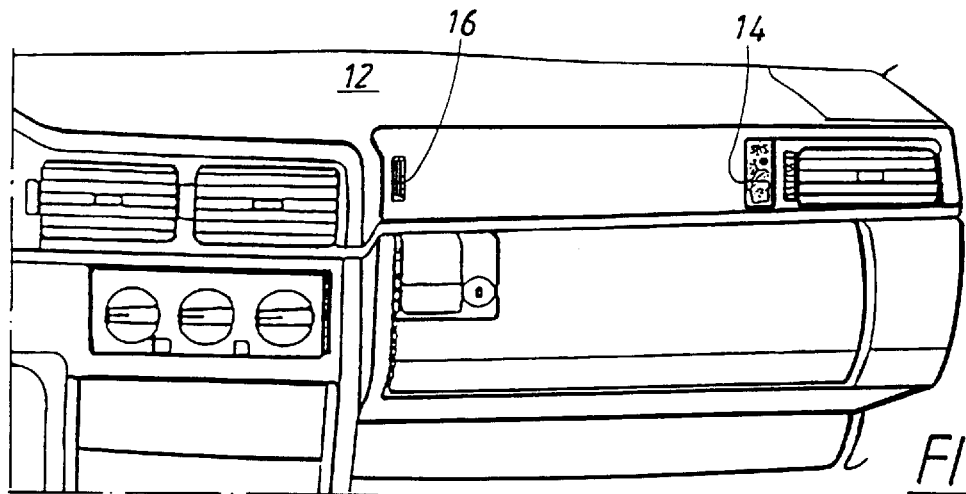
FIG. 1 is a schematic perspective view of a vehicle dashboard fitted with the arrangement according to the present invention, the arrangement placing an airbag in an armed condition.
Figure 2:
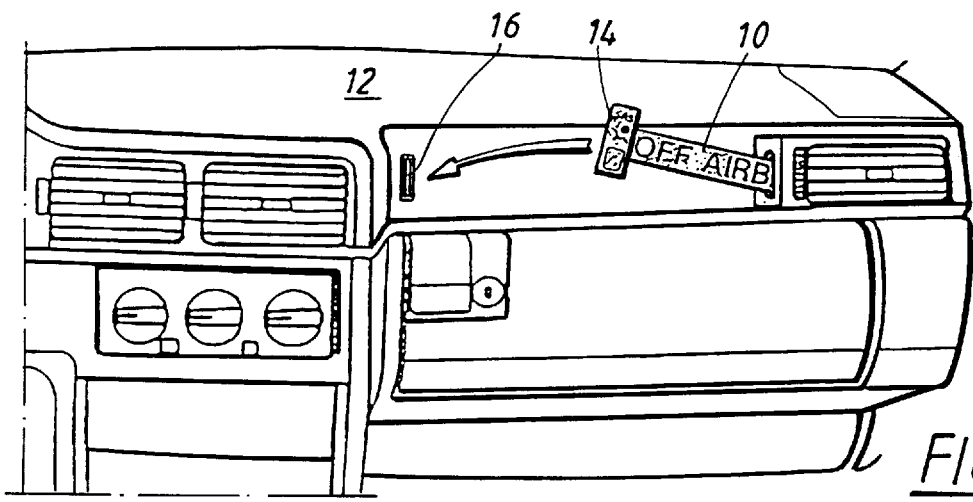
FIG. 2 is a view corresponding to FIG. 1, though with the arrangement shown in the process of being operated.
Figure 3:
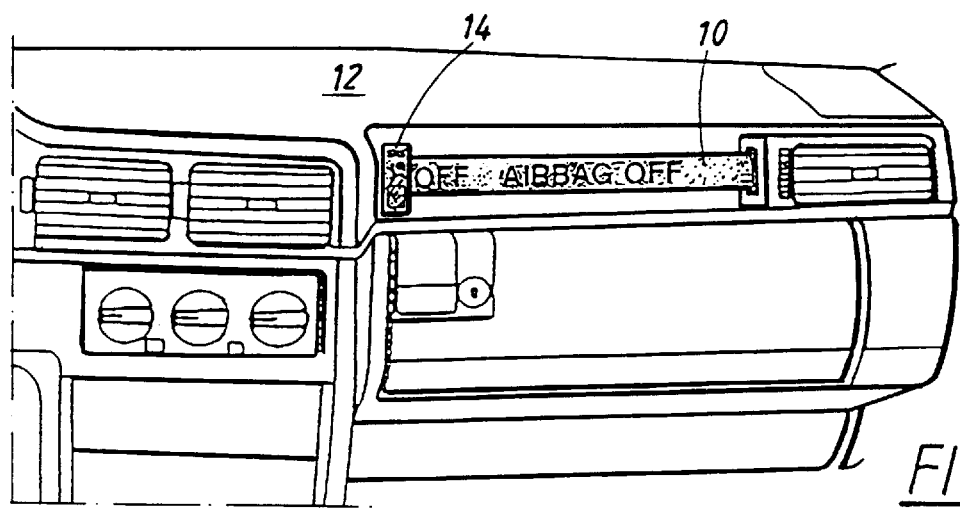
FIG. 3 is a view corresponding to FIG. 1, though with the arrangement placing an airbag in a disarmed condition.

DETAILED DESCRIPTION OF PREFERRED EMBODIMENTS:

With reference to FIGS. 1 to 3, the arrangement in accordance with the present invention for selectively disconnecting an airbag fitted within a component of a motor vehicle comprises a visible indicator in the form of, for example, a strip or ribbon 10 of preferably brightly coloured material. In the drawings, the airbag is located within a vehicle dashboard 12, though it is to be understood that the arrangement which is described in the following may be implemented on airbags which are located within any component within the vehicle, for example in the roof, the backrest of a seat, a door, etc.

Thus, and using the vehicle dashboard 12 as one example of a suitable component, one end of the ribbon 10 is attached to a winding arrangement located within the dashboard 12, whilst the other end of the ribbon is provided with a handle 14 or similar means to allow the ribbon to be manually drawn across the dashboard and secured to a receiving element 16 suitably located on the dashboard. The handle 14 may be provided with not shown projections which are arranged to be received within the receiving element 16.

When it is desired to reactivate the airbag, the handle 14 is grasped and removed from the receiving element 16 to thereby allow the ribbon 10 to be retracted into the dashboard and wound onto the winding arrangement.

The provision of a highly visible indicator in the manner described above implies that the occupant of the seat for whom the airbag is intended to offer protection can immediately ascertain whether the airbag is disconnected or not. The airbag may be intended for a rear seat occupant, in which case the component within which the warning means is retractable could be the backrest of the front seat. This being the case, the visible indicator can be in the form of a brightly coloured ribbon which is drawn over the side of the front seat backrest facing the rear seat passenger. Preferably, the ribbon is made to extend at least partially around the side of the front seat so that the driver of the vehicle can also easily ascertain the condition of the airbag. The exact positioning of the ribbon is not critical. Important is only that the ribbon is easily visible by at least the occupant of the seat for whom the airbag is intended to offer protection.

Two principal means for achieving disconnection of the airbag, both based on the above-described visible arrangement, will be hereinafter described.

Figure 4:
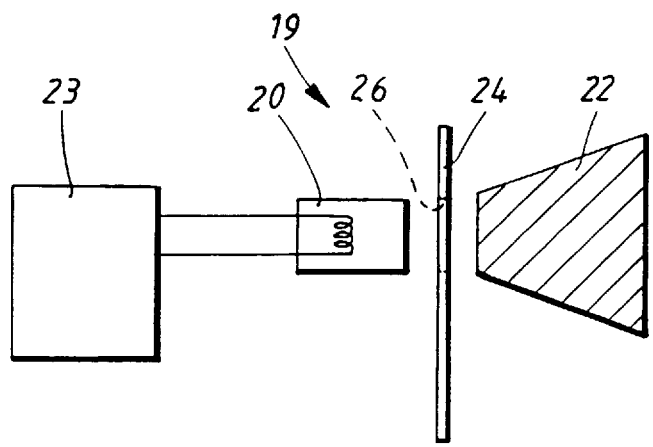
FIG. 4 and 5 are schematic representations of a mechanical embodiment for disarming an airbag.
Figure 5:
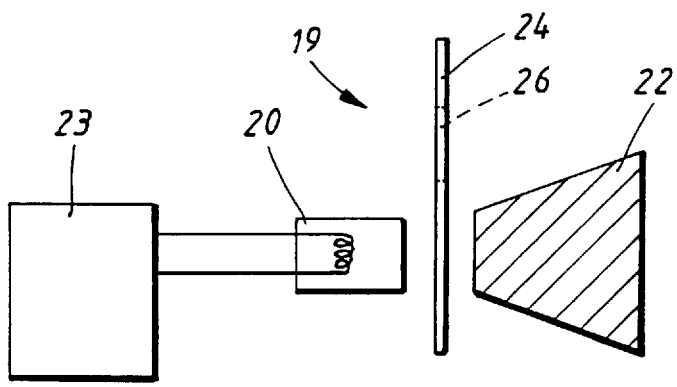

The first means may be termed a mechanical device for disconnecting the passenger airbag. This device is schematically illustrated in FIGS. 4 and 5 of the attached drawings. To appreciate the function of the mechanical device, it is necessary to understand the basic operating principles of a conventional vehicle airbag. Thus, in the drawings reference numeral 19 generally denotes airbag deployment means comprising, in the shown example, a squib 20 which is electrically actuated to ignite a precharge 22 for a gas generator (not shown) which provides gas for inflating the airbag. When the vehicle to which the airbag is fitted is subjected to a predetermined set of conditions corresponding to those which arise when the vehicle is involved in a collision of certain severity, the squib 20 receives an electrical impulse from the airbag control module 23. This impulse is sufficient to cause the squib to explode and to thereby ignite the gas generator precharge.

In the mechanical device for disconnecting the passenger airbag, a shutter 24 is provided which is displaceable in a gap between the squib 20 and the precharge 22. The shutter is preferably provided with an opening 26 and is arranged such that when the airbag is armed, the opening is positioned directly between the squib and the precharge. This position corresponds to the position of the ribbon 10 shown in FIG. 1, i.e. when the ribbon is retracted within the vehicle dashboard.

When it is desired to disconnect the airbag, the ribbon is drawn across the dashboard and the handle 14 is secured to the receiving element 16 (FIG. 3). As the ribbon is brought into this position, the shutter 24 moves through the gap between the squib 20 and the precharge 22 to thereby shield the precharge from the squib. Should the vehicle now be subjected to conditions which would normally cause the airbag to be inflated, the squib will be ignited. Because of the position of the shutter, however, the precharge will not be ignited and consequently the airbag will not be deployed.

The shutter 24 is advantageously designed in such a manner to clearly indicate against what part of the shutter the squib has been ignited, thus making it easily possible to establish the condition of the passenger airbag in the event of an accident.

The shutter 24 may be arranged to execute either a linear movement or a rotational movement when displaced between the armed and disarmed positions.

The above-described mechanical device can be employed on any type of airbag actuation arrangement. For example, the airbag may be arranged to be inflated by the release of a compressed gas. In such case, the shutter 24 can be located between the release valve for the compressed gas and the release valve actuator pin.

An advantage with the mechanical device described above is that when the vehicle to which the airbag is to be fitted is being assembled, the shutter may be maintained in the disarmed position. Thus, if an electrical connection is incorrectly made during the assembly, the squib (or other igniter triggering means) will ignite, but not the precharge. This naturally increases the safety for the assembly personnel and protects the vehicle dashboard and the remainder of the airbag assembly from unnecessary damage. Clearly, such a mechanical blocking device may also be incorporated in the driver's side airbag for use solely during vehicle assembly.

Figure 6:
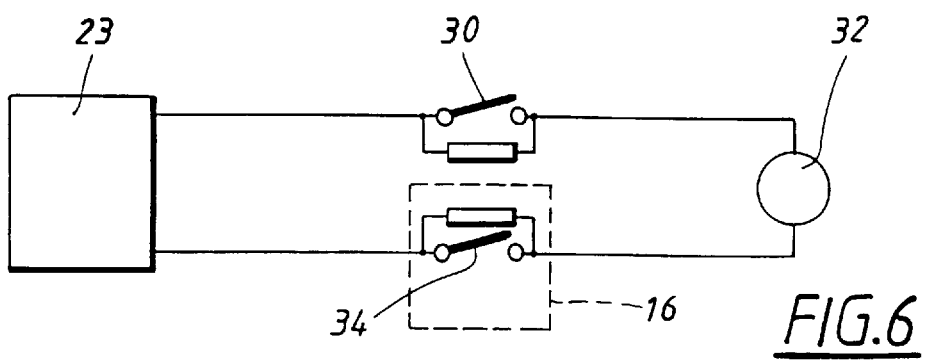
FIG. 6 is a schematic representation of an electrical embodiment for disarming an airbag.

The second means may be termed an electrical device for disconnecting the passenger airbag. In such a device, and as shown in FIG. 6, when the ribbon 10 is pulled out to its full length, a first switch 30 in the vicinity of the winding arrangement (not shown) disconnects a first connection to the airbag igniter 32. When the ribbon is secured to the receiving element 16, a second switch 34 within the receiving element disconnects the second connection to the airbag igniter. Both switches are preferably provided with resistors in parallel to make diagnosis of the switch positions possible. In this manner, the status of the ribbon can be recorded in the crash recorder of the airbag control module 23. Thus, in the event of an accident, it can be determined whether the passenger airbag was connected or disconnected.

The above-described electrical device allows the switch system to be integrated directly into the gas generator for the passenger airbag unit, with only slight changes in the software of the airbag control module 23 being required.

The invention is not to be construed as being limited to the embodiments described above and illustrated in the drawings, but may be varied within the scope of the appended claims.

I claim:

1. An arrangement for selectively disconnecting an airbag fitted within a passenger compartment of a motor vehicle, said airbag being provided with an airbag deployment device, said arrangement comprising a visible warning member retractable within a component inside the passenger compartment and adapted to be withdrawn to extend over at least a predetermined region of said component, said warning member cooperating with said airbag deployment device such that when said warning member is in a retracted position within said component, said airbag deployment device is armed and when said warning member is in a withdrawn position, said airbag deployment device is disarmed.

2. The arrangement as claimed in claim 1, wherein said visible warning member is a ribbon.

3. The arrangement as claimed in claim 1, wherein said warning member cooperates with a switch to electrically disarm said airbag deployment device when said warning member is in said withdrawn position.

4. The arrangement as claimed in claim 1, wherein said warning member cooperates with a shutter to mechanically disarm said airbag deployment device when said warning member is in said withdrawn position.

5. The arrangement as claimed in claim 4, wherein said shutter is arranged to pass between a squib and a gas generator precharge of the airbag deployment device.

6. The arrangement as claimed in claim 4, wherein said shutter is arranged to block an inflation valve for said airbag.

7. The arrangement as claimed in claim 1, wherein said visible warning member is a strip.

8. The arrangement as claimed in claim 1, wherein said visible warning member is of a highly visible color.

* * * * *